3,043,801
PREPOLYMER COMPRISING THE REACTION PRODUCT OF A POLYISOCYANATE, A POLY- ALKYLENE ETHER POLYALCOHOL AND AN AMINE OR PHENOL, REACTION PRODUCT THEREOF WITH FORMALDEHYDE, AND PROCESS FOR PREPARING SAME
Kuno Wagner and Erwin Müller, Leverkusen, Hans Holtschmidt, Koln-Stammheim, and Otto Bayer, Leverkusen, Germany, assignors, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Dec. 31, 1958, Ser. No. 784,085
Claims priority, application Germany Jan. 2, 1958
25 Claims. (Cl. 260—47)

This invention relates to a process for the preparation of polyurethane plastics. More particularly, this invention relates to a process for the preparation of polyurethane plastics wherein a novel prepolymer is cross-linked with formaldehyde, compounds which liberate formaldehyde and/or compounds which contain methylol groups.

It has been proposed heretofore to manufacture cross-linked polyurethane plastics by reacting a prepolymer obtained from an organic polyisocyanate and a polyester or a polyester amide, with formaldehyde, compounds which liberate formaldehyde or compounds containing at least two methylol groups. These previously known prepolymers have a low reactivity toward formaldehyde, compounds which liberate formaldehyde and compounds containing at least two methylol groups and, consequently it has been necessary to use excess quantities of these cross-linking agents in the preparation of the final product. The use of excess quantities of these cross-linking agents is not only an added expense in the preparation of polyurethane plastics prepared from these reagents but also has certain other disadvantages which do not become apparent immediately on their manufacture, making the quality-control of the articles produced difficult. Thus, the disadvantageous properties do not always become apparent even after vulcanization under pressure.

The disadvantageous properties which may become apparent immediately or only after repeated thermal or mechanical stressing are evidenced by a deterioration in mechanical properties which are first noticeable by the appearance of zones permeated with extremely fine bubbles and consequent weakening of the polyurethane plastic material. Continued use results in breaks or tears at the point of the appearance of the zone of bubbles. These disadvantageous properties result even when the products are used at relatively moderate temperatures within the range of about 60°–90° C. Further, not only the mechanical properties, as evidenced by a decrease in the tensile strength and the structural strength, but often also permanent elongation of the materials is adversely affected by the use of excess quantities of these cross-linking agents.

These disadvantageous properties can be shown to be a result of the use of the excess quantities of these cross-linking agents which are necessarily used with the present prepolymer systems because of their low reactivity toward formaldehyde, compounds which liberate formaldehyde, and compounds containing methylol groups. The lowering of the tensile strength, structural strength and also the permanent elongation is a result of the effectiveness of these cross-linking materials or reagents yielding these materials as blowing agents. Thus, the excess quantities of formaldehyde, which are not used in cross-linking the prepolymer, polyoxymethylene dihydrates generated in the process which are readily decomposed by heat, and other agents giving off formaldehyde, should be eliminated from the final product because they lead to subsequent undesirable cross-linking effects.

However, with present prepolymer systems the amount of these cross-linking agents cannot be reduced to just the amount theoretically sufficient for cross-linking reactions. An excess must be used or unusable, incompletely cross-linked products will result since the substituted urethane, urea, and amide groups of the prepolymers have such a low reactivity toward these cross-linking agents.

Thus, while it is advantageous to use these materials as cross-linking agents because they are relatively cheap and convenient to use and because of the advantageous properties resulting from their use, it has been tried to cross-link isocyanate-modified polyesters with formaldehyde under concurrent use of an additional amount of a diisocyanate. The products obtained thereby exhibit, however, an insufficient resistance to cold.

It is further known to link polyesters with aryldioxalkylamines by means of isocyanate groups and to cross-link the modified polyesters thus obtained with formaldehyde. By following this procedure it is no longer necessary to employ an additional amount of diisocyanate in the formaldehyde cross-linking step. The resistance to cold of these products is, however, still insufficient.

It is an object of this invention to provide an improved process for the preparation of polyurethane plastics. Another object of this invention is to provide a process for the preparation of polyurethane plastics cross-linked with formaldehyde, compounds which liberate formaldehyde and/or compounds containing methylol groups. Still another object of this invention is to provide prepolymers and a process for their preparation, which can be cross-linked with small amounts of formaldehyde, compounds which liberate formaldehyde and/or compounds containing methylol groups to form a polyurethane plastic.

The foregoing objects and others, which will become obvious from reading the following disclosure, are accomplished, in accordance with the invention, generally, speaking, by providing a process for the preparation of cross-linked polyurethane plastics which comprises reacting a prepolymer, obtained from an organic polyisocyanate, a polyalkylene ether polyalcohol containing oxygen and/or sulfur ether bridges and an hydroxy-alkylated aromatic amine and/or an hydroxy-alkylated phenol, with formaldehyde, compounds which liberate formaldehyde, and/or organic compounds with at least two methylol groups. Thus, this invention contemplates a process for the preparation of prepolymers which comprises reacting an organic polyisocyanate with a polyalkylene ether polyalcohol containing oxygen and/or sulfur ether bridges and an hydroxy-alkylated aromatic amine and/or an hydroxy-alkylated phenol to prepare a prepolymer suitable for reaction with a cross-linking amount of formaldehyde, a compound which liberates formaldehyde and/or an organic compound containing at least two methylol groups. The prepolymers of this invention are exceptionally reactive and consequently are capable of being cross-linked with particularly small quantities of formaldehyde, compounds which liberate formaldehyde and/or organic compounds containing at least two methylol groups.

The improved resistance to cold of the reaction products of the present process as compared with the known products can be seen by comparing the freezing temperature and the buffer maximum according to DIN 3513, and "Kautschuk" 19, 1943, page 47. The plastic prepared according to the Example 1 shows a freezing temperature of −30° C. and a buffer maximum of −22° C. The plastic prepared according to Example 3 exhibits a freezing temperature of −45° C. and a buffer maximum of −32° C. In contrast thereto, a product obtained by using a polyester according to the prior art yields a plastic having a freezing temperature of −25° C. and a buffer maximum of −15° C. If following another known process (an isocyanate-modified polyester is cross-linked with formaldehyde and an additional amount of diisocyanate), a freezing temperature of −25° C. and a buffer maximum of −16° C. are observed.

According to the process of this invention, one may react any polyalkylene ether polyalcohol containing oxygen and/or sulfur ether bridges with any organic polyisocyanate either alone and thereafter with a hydroxy-alkylated aromatic amine and/or hydroxy-alkylated phenol or in admixture therewith or as an etherification product thereof to obtain a prepolymer which will have exceptional reactivity toward formaldehyde, a compound which liberates formaldehyde and/or an organic compound having at least two methylol groups. According to the process of this invention, then, cross-linked polyurethane plastics are prepared by reacting well known polyalkylene polyalcohols containing oxygen and/or sulfur ether bridges, which may be, for example, polymerized alkylene oxides or polythioethers having terminal hydroxyl groups, with organic polyisocyanates, either of which may previously have been reacted with an hydroxy-alkylated aromatic amine and/or an hydroxy-alkylated phenol to prepare either an —NCO terminated or hydroxyl terminated prepolymer which is thereafter reacted with a formaldehyde, a compound which liberates formaldehyde and/or an organic compound which has at least two methylol groups.

A preferred embodiment of this invention involves the reaction of an organic diisocyanate with a polyalkylene polyalcohol containing oxygen and/or sulfur ether bridges, said polyalkylene polyalcohol having a molecular weight of at least about 500 and an hydroxyl number of not substantially more than about 225, such as, for example, polyalkylene ether polyalcohols obtained from the condensation of alkylene oxides or from alkylene oxides with polyhydric alcohols, polythioethers obtained from the condensation of thioether glycols or from thioglycols with polyhydric alcohols, to prepare an —NCO terminated reaction product, thereafter reacting said —NCO terminated reaction product with an hydroxy-alkylated aromatic amine and/or an hydroxy-alkylated phenol to prepare an hydroxy terminated prepolymer and thereafter reacting said hydroxy terminated prepolymer with not substantially more than a cross-linking amount of formaldehyde, compounds which liberate formaldehyde and/or organic compounds which contain at least two methylol groups. Of course, the order of addition of the organic polyisocyanate, the polyalkylene polyalcohol and the hydroxy-alkylated aromatic amine or phenol is not critical so long as there are suitable reactive groups present in each step. Also, either an —NCO terminated prepolymer, a hydroxy terminated or other reactive hydrogen terminated product may be prepared by the process of this invention suitable for cross-linking with one of the aforementioned cross-linking agents. The hydroxy terminated prepolymers are preferred because they are more easily stored for extended periods of time.

Any suitable hydroxy-alkylated aromatic amine or phenol may be used according to the process of the invention to prepare prepolymers having exceptional reactivity for cross-linking with formaldehyde, compounds which liberate formaldehyde and/or organic compounds containing at least two methylol groups, resulting in superior cross-linked polyurethane plastics.

As used herein the term hydroxy-alkylated aromatic amine refers to aromatic amino compounds wherein a nitrogen atom is bonded directly to an aromatic ring carbon atom and wherein the amino hydrogens have been replaced with hydroxy terminated alkylene radicals. Thus, for example, one may employ hydroxy-alkylated derivatives of aromatic amines such as aniline, toluidine and xylidine which may be represented by the generic formula:

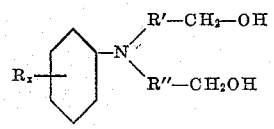

wherein R may be hydrocarbyl, such as, for example, alkyl, aryl, alkaryl, aralkyl and the like, R' and R" may be either the same or different and may be alkylene, $x$ is 0 to 5.

The hydroxy-alkylated aromatic monoamines having alkylene radicals attached to the nitrogen atom of $C_1$ to $C_{10}$ are preferred. Some examples of the hydroxy-alkylated aromatic amines are:

5-N-di-(beta-hydroxylethyl) 1,3-dimethyl benzene
4-N-di-(beta-hydroxyethyl) 1,3-dimethyl benzene
5-N-di-(omega-hydroxypropyl) 1,3-dimethyl benzene
4-N-di-(omega-hydroxy butyl) 1,5-dimethyl benzene
4-N-di-(beta-hydroxyethyl) 1-phenyl, 3-methyl benzene
1-N-di-(beta-hydroxyethyl) indene
1-N-di-(beta-hydroxyethyl) fluorene
4-N-di-(beta-hydroxyethyl) 1,3,5-trimethyl benzene
4-N-di-(omega-hydroxyamyl) 1,3,5-trimethyl benzene
4-N-di-(beta-hydroxyethyl) diphenyl methane
4-N-di-(beta-hydroxyethyl) anthracene
4-N-di-(omega-hydroxydecyl) 1,3-dimethyl benzene
4-N-beta-hydroxyethyl, 4-N-omega-hydroxyl propyl, 1,3-dimethyl benzene As used herein, the term hydroxy-alkylated phenol refers to hydroxy-alkylated phenols having hydroxy terminated alkylene radicals attached to phenolic oxygen atoms, i.e. aromatic ethers of phenols. Thus, for example, one may employ hydroxy-alkylated derivatives of monohydric, dihydric or higher polyhydric phenols which may be represented by the generic formula:

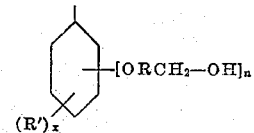

wherein R may be alkylene, $x$ may be 3 to 5, $n$ is 1 to 3 and R' may be hydrogen or hydrocarbyl, such as, for example, alkyl, aryl, aralkyl, alkaryl and the like. The hydroxy-alkylated phenols having alkylene radicals attached to the phenolic oxygen atom of $C_1$ to $C_{10}$ are preferred. Some examples of the hydroxy-alkylated phenols are:

Resorcinol-di-beta-hydroxyethyl ether
Naphthalene-1,5-di-beta-hydroxyethyl ether
1,3-dimethyl benzene-5,6-beta-hydroxyethyl ether
1,3-dimethyl benzene-5,6-omega-hydroxydecyl ether
Naphthalene-1,5-di-omega-hydroxy propyl ether
Pyrogallol-tri-beta-hydroxyethyl ether
Triquinoyl-tri-beta-hydroxyethyl ether
Catechol-di-beta-hydroxyethyl ether
Hydroquinol-di-omega-hydroxypropyl ether
Pyrogallol-1-beta hydroxyethyl, 2-omega-hydroxypropyl, 3-omega-hydroxyamyl ether Polyalkylene polyalcohols containing oxygen and/or sulfur ether bridges are well known to persons skilled in the art. Those having at least two hydroxyl groups reactive with an —NCO group, are preferred. Those which are especially useful in the process of the present invention are those polyalkylene polyalcohols which have a molecular weight of at least 500, and hydroxyl number not substantially greater than about 225. Most preferred are those polyalkylene ether polyalcohols which have a molecular weight within the range of about 500 to about 10,000, and an hydroxyl number within the range of about 20 to about 225.

Especially to be mentioned are the polyalkylene ether polyalcohols obtained from the condensation of alkylene oxides, such as, for example, those produced as polymerization products of propylene oxide or tetrahydrofuran, co-polymers of these with one another or with ethylene oxide and addition products of alkylene oxides with polyhydric alcohols, such as, for example, the addition product of propylene oxide to trimethylol propane, as well as the addition products of the aforementioned hydroxy-alkylated aromatic amines or phenols with alkylene oxides, such as, ethylene oxide. Also employed are the polythioethers which include the condensation products of thioether glycols, such as, for example, the condensation products of thioglycol with itself or with other polyhydric alcohols, such as, for example, ethylene glycol, diethylene glycol, trimethylol propane and the like, as well as with the aforementioned hydroxy-alkylated aromatic amines or phenols. Also suitable are the polycondensation products of thioether glycols, such as, for example, thiodiglycol with aromatic amines, such as, for example xylidines, toluidines or with reaction products of these aromatic amines with one mol of an alkylene oxide, such as, for example, ethylene oxide, propylene oxide, and the like.

Any suitable organic polyisocyanate may be used for reaction with either the polyalkylene polyalcohol containing oxygen and/or sulfur ether bridges, the hydroxy-alkylated aromatic amines or phenols, mixtures thereof, or etherification products thereof. Thus, one may employ organic polyisocyanates, such as, for example, pentamethylene diisocyanate, hexamethylene diisocyanate, 1,4-cyclohexylene diisocyanate, 4,4'-dicyclohexylmethane diisocyanate, m-phenylene diisocyanate, p-phenylene diisocyanate, 4,4'-diphenyl methane diisocyanate, toluylene-2,4-diisocyanate, toluylene-2,6-diisocyanate, 1,5-naphthylene diisocyanate, 1,3,5-benzene triisocyanate, the reaction product of 1 mol of trimethylolpropane and 3 mols of 2,4-toluylene diisocyanate, and the like. The aliphatic diisocyanates or mixtures containing aliphatic diisocyanates are preferred.

As previously set forth, the prepolymers used according to the invention, for reaction with formaldehyde, a compound which liberates formaldehyde and/or an organic compound containing at least two methylol groups, may be prepared in a wide variety of methods, employing several different orders of addition. Thus, for example, a mixture of the polyalkylene ether polyalcohol and the hydroxy-alkylated aromatic amine or phenol may be reacted with the polyisocyanate. It is, however, also possible first to react the polyhydroxy compound with an excess of the polyisocyanate and then carry out the further reaction with the hydroxy-alkylated aromatic amine or phenol. It is also possible to react the hydroxy-alkylated aromatic amine or phenol with an excess of the polyisocyanate to produce an —NCO terminated product and thereafter add the polyalkylene ether polyalcohol. Furthermore, during the production of the polyhydroxy compound, the hydroxy-alkylated aromatic amine or phenol can be incorporated therein by etherification, so that the polyhydroxy compound has only to be further modified with the polyisocyanate. Another possibility is for the polyhydroxy compound, already containing the hydroxy-alkylated aromatic amine or phenol, to be additionally linked through urethane bonds, according to one of the first-mentioned embodiments above.

The hydroxy-alkylated aromatic amine or phenol may be used in any suitable amount. It is preferred, however, to employ quantities of the hydroxy-alkylated aromatic amines or phenols in an amount within the range of about 0.5 to 3 mols for each one mol of polyalkylene ether polyalcohol.

The quantity thereof further depends on both the reactivity, with respect for formaldehyde, or the other cross-linking agents and also the nature of the desired property diagram of the final polyurethane plastic when cross-linked with formaldehyde, compounds which liberate formaldehyde and/or organic compounds containing at least two methylol groups. Elevated temperatures of about 50° to about 130° C. may be advantageously employed in the cross-linking step. Either the —NCO terminated prepolymer or the hydroxyl terminated prepolymer referred to above may be cross-linked with formaldehyde, compounds which liberate formaldehyde or organic compounds having at least two methylol groups.

It is obvious that, in addition to the components set forth above, other bifunctional additives may also be used concurrently for lengthening the chain, such as, for example, water, aliphatic and aromatic diamines, alkylene glycols and the like, such as, for example, ethylene diamine, p-phenylene diamine, ethylene glycol and the like. By this means, it is possible for the physical properties of the cross-linked polyurethane plastics to be varied over wide limits.

The prepolymers prepared according to the process of this invention are thermoplastic, may be stored and may be processed on rubber mixing rollers. Cross-linking is accomplished by incorporating the cross-linking agent into the prepolymer in any suitable manner.

Any suitable formaldehyde, compound which liberates formaldehyde and/or organic compound containing at least two methylol groups may be used to cross-link the prepolymers of this invention. Suitable cross-linking agents are, for example, formaldehyde in concentrated solutions, hemi-acetals of ethylene glycol and diethylene glycol, paraformaldehyde, hexamethylene tetramine, trioxane, dimethylol urea, hexamethylol melamine or their methylol ethers, polymethylol compounds of hexamethylene diurea, adipic acid dimethylol amides and their methylol ethers and also co-polymerization products with incorporated methacrylamine-methylol-methyl ether and polymethylol compounds of polycaprolactam and their methylol ethers. These cross-linking agents are incorporated into the prepolymers on rollers and/or homogeneously distributed together with fillers, such as, for example, carbon black or silica.

It is an advantage of the present process that it is possible in many cases to operate without using acid catalysts. The incorporation, by rolling, of acid hardening catalyts, for exampe, inorganic or organic acids or compounds splitting off acids, or acid salts, zinc chloride or complex salts of zinc chloride, may, however, be effected by rolling simultaneously with or subsequently to the incorporation of the cross-linking agent, if desirable. Organic bases or metal oxides, such as, for example, zinc oxide or magnesium oxide, may be added to fix the acids which are liberated.

Very small quantities of formaldehyde are sufficient for converting the products from the storable stage into the cross-linked condition. In many cases, it is possible to operate with about 0.4 to about 1.5% of free formaldehyde, calculated on the storable intermediate sheet. The quantity used naturally depends on the reactivity of the material and the efficacy of the acid catalysts used, if any.

According to one particular form of the present process, a further quantity of polyisocyanate or a substance which liberates polyisocyanate may be incorporated by rolling together with formaldehyde, a compound which liberates formaldehyde and/or a methylol compound as more fully characterized above.

The resulting storable sheets are then vulcanized with simultaneous shaping at elevated temperature, preferably between about 100° C. and about 160° C.

As regards the property diagram of the vulcanized products, the process of the invention offers advantages such as have not been produced by the formaldehyde cross-linking of the previously known isocyanate-modified prepolymers.

Owing to the increased reactivity of the prepolymers obtained by incorporation of the hydroxy-alkylated aromatic amines or phenols, it is further possible to operate with substantially smaller quantities of cross-linking agents. By this means, a more or less rapidly-proceeding continuous cross-linking after the vulcanization process due to excess formaldehyde is obviated and, above all, the formation of bubbles, lack of homogeneity and stresses and crack formation occurring as a result of thermal stressing of the materials, is reduced to a minimum.

In order to better describe and further classify the invention, the following are specific embodiments.

*Example 1*

About 500 parts by weight of a polybutadiene glycol with an OH number of about 47.6 and about 75 parts by weight of 5-N-di-(beta-hydroxyethyl)-1,3-dimethyl benzene are dehydrated for approximately half an hour at about 130° C./18 mm., residual water content: about 0.07%. When the temperature has fallen to about 90° C., about 100 parts by weight of hexamethylene diisocyanate are incorporated by stirring and the mixture is kept at this temperature for about 3 hours. The viscous melt is poured on to a support and further heated for about 48 hours at about 100° C. The material thus obtained is rolled out to form a smooth sheet.

For cross-linking purposes, about 80 parts by weight of carbon black, about 0.5 part by weight of stearic acid and then a thoroughly powdered mixture of about 1.8 g. of trioxane and 0.4 part by weight of zinc chloride is homogeneously incorporated into 200 parts by weight of this sheet. Cross-linking and shaping takes place in 30 minutes at 140° C–150° C. The mechanical properties of a test plate are:

Thickness of the test plate_____ 3.8 mm.
Tensile strength_____ 238 kg./cm.².
Breaking elongation_____ 585%.
Shore hardness_____ 67°.
Elasticity _____ 52%.
Permanent elongation_____ 12%.

If about 0.7 part by weight of paraformaldehyde is used instead of the trioxane for cross-linking purposes, the material obtained after cross-linking has the following mechanical properties:

Thickness of the test plate_____ 3.9 mm.
Tensile strength_____ 150 kg./cm.².
Breaking hardness_____ 280%.
Shore hardness_____ 72°.
Elasticity _____ 52%.
Permanent elongation_____ 2%.

If 5-N-di-(beta-hydroxyethyl)-1,3-dimethyl benzene is replaced by the equivalent quantity of butane-1,4-diol, no vulcanization is obtained even by incorporating about 8 parts by weight of paraformaldehyde by rolling. The products obtained are unusable and foamy.

*Example 2*

About 500 parts by weight of a polybutylene glycol with an OH number of 42 and about 75 parts by weight of 5-N-di-(beta-hydroxyethyl)-1,3-dimethyl benzene are dehydrated at about 130° C. in vacuo as in Example 1. When the temperature has fallen to about 90° C. About 95 parts by weight of a mixture of about 70 parts by weight of 1-methyl benzene-2,4-diisocyanate and about 30 parts by weight of 1-methyl benzene-2,6-diisocyanate are incorporated by stirring. The temperature is maintained for about 1 hour at about 90° C. The viscous melt is heated for 12 hours at about 100° C. after having been poured on to a support.

After being rolled out into a smooth sheet, about 80 parts by weight of carbon black, about 2.5 parts by weight of paraformaldehyde and about 0.4 part by weight of zinc chloride are homogeneously incorporated into about 200 parts by weight of sheet. After cross-linking as in Example 1, a material which has the following mechanical properties is obtained:

Thickness of the test plate_____ 3.2 mm.
Tensile strength_____ 211 kg./cm.².
Breaking elongation_____ 375%.
Shore hardness_____ 65°.
Elasticity _____ 42%.
Permanent elongation_____ 6%.

*Example 3*

About 450 parts by weight of a polythioether with an OH number of 53.5 and about 150 parts by weight of polyethylene glycol with an OH number of 64, as well as about 90 parts by weight of 5-N-di-(beta-hydroxyethyl)-1,3-dimethyl benzene, are dehydrated for about 30 minutes at about 130° C. and thereafter reacted at about 90° C. with about 120.5 parts by weight of hexamethylene diisocyanate. After about 60 minutes, the viscous melt is poured out on to a support and further heated for about 12 hours at about 100° C. About 80 parts by weight of carbon black, about 1.8 parts by weight of paraformaldehyde and about 0.4 part by weight of zinc chloride are incorporated into about 200 parts by weight of the resulting sheet. After cross-linking for about 30 minutes at about 150° C., a material which has the following mechanical properties is obtained:

Thickness of the test plate_____ 3.7 mm.
Tensile strength_____ 110 kg./cm.².
Breaking elongation_____ 250%.
Shore hardness_____ 75°.
Elasticity _____ 40%.
Permanent elongation_____ 2%.

*Example 4*

About 600 parts by weight of a polythioether with an OH number of 53.6 and about 74.4 parts by weight of 1,5-di-beta-hydroxyethyl naphthalene ether are dehydrated for about 30 minutes at about 130° C. About 90.7 parts by weight of hexamethylene diisocyanate are thereafter added at the same temperature. The melt is poured after about 21 minutes on to a support, heated for about another 12 hours at about 100° C. and then rolled out to form a smooth sheet.

About 80 parts by weight of carbon black, about 3 parts by weight of paraformaldehyde and about 0.4 part by weight of zinc chloride are incorporated into about 200 parts by weight of sheet. After cross-linking at about 250° C. a test plate having the following mechanical properties is obtained:

Thickness of the test plate_____ 3.5 mm.
Tensile strength_____ 115 kg./cm.².
Breaking elongation_____ 245%.
Shore hardness_____ 90°.
Elasticity _____ 36%.
Permanent elongation_____ 6%.

*Example 5*

Using about 600 parts by weight of a polythioether with an OH number of 53.5, about 59.5 parts by weight of di-beta-hydroxyethyl-resorcinol ether and about 93 parts by weight of hexamethylene diisocyanate, a procedure similar to that of Example 2 is adopted. After about 13 minutes, the viscous melt is poured out and heated for about another 19 hours at about 100° C. About 0.7 part by weight of stearic acid, about 80 parts by weight of carbon black and about 4 parts by weight of dimethylol urea admixed with about 0.4 part by weight of ammonium chloride are incorporated into about 200 parts by weight of sheet. After cross-linking for about 30 minutes at about 150° C., a test plate having the following mechanical properties is obtained:

Thickness of the test plate_____ 3.6 mm.
Tensile strength_____ 120 kg./cm.².

Breaking elongation _____ 245%.
Shore hardness _____ 80°.
Elasticity _____ 38%.
Permanent elongation _____ 6%.

Although only some of the reactants, more fully disclosed above, were employed in the examples representing specific embodiments of the present invention, it is to be understood that any organic polyisocyanate, any polyether or polythioether, as well as the hydroxy-alkylated aromatic amines and hydroxy-alkylated phenols could have been used in the preparation of prepolymer. Further, any of the cross-linking agents, more fully disclosed above, could have been used.

The polyurethane plastics obtained by the process of the present invention are useful in a variety of commercial applications, such as, for example, the preparation of various molded articles and more particularly tires, shoe heels, toys and the like.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

What is claimed is:

1. A process for the preparation of a cross-linked polyurethane plastic which comprises reacting a prepolymer obtained from an organic polyisocyanate, a polyalkylene ether polyalcohol containing ether bridges selected from the group consisting of oxygen and sulfur ether bridges, and a member selected from the group consisting of hydroxy-alkylated aromatic amines and hydroxy-alkylated phenols with a member selected from the group consisting of formaldehyde and precursors thereof.

2. The process of claim 1 wherein said organic polyisocyanate is an organic diisocyanate.

3. A process for the preparation of a cross-linked polyurethane plastic which comprises reacting a prepolymer obtained from an isocyanate-modified polyalkylene ether polyalcohol containing ether bridges selected from the group consisting of oxygen and sulfur ether bridges, and a member selected from the group consisting of hydroxy-alkylated aromatic amines and hydroxy-alkylated phenols with a member selected from the group consisting of formaldehyde and precursors thereof.

4. A process for the preparation of a cross-linked polyurethane plastic which comprises reacting a prepolymer obtained from an organic polyisocyanate and a member selected from the group consisting of polyalkylene ether polyalcohols and polythioether polyalcohols and a member selected from the group consisting of hydroxy-alkylated aromatic amines and hydroxy-alkylated phenols with a member selected from the group consisting of formaldehyde and precursors thereof.

5. A process for the preparation of a cross-linked polyurethane plastic which comprises reacting a prepolymer obtained from an organic polyisocyanate and a member selected from the group consisting of polyalkylene ether polyalcohols obtained from the condensation of an alkylene oxide and polythioethers obtained from the condensation of thioether glycols and a member selected from the group consisting of hydroxy-alkylated aromatic amines and hydroxy-alkylated phenols with not substantially more than a cross-linking amount of a member selected from the group consisting of formaldehyde and precursors thereof.

6. A process for the preparation of a cross-linked polyurethane plastic which comprises reacting an organic polyisocyanate with a member selected from the group consisting of hydroxy-alkylated aromatic amines and hydroxy-alkylated phenols to prepare an —NCO terminated product, thereafter reacting said —NCO terminated product with a polyalkylene ether polyalcohol containing ether bridges selected from the group consisting of oxygen and sulfur ether bridges to prepare a prepolymer, and thereafter reacting said prepolymer with a member selected from the group consisting of formaldehyde and precursors thereof.

7. A process for the preparation of a cross-linked polyurethane plastic which comprises reacting a prepolymer having terminal hydroxyl groups obtained from an isocyanate-modified polyalkylene ether polyalcohol containing ether bridges selected from the group consisting of oxygen and sulfur ether bridges and a member selected from the group consisting of hydroxy-alkylated aromatic amines and hydroxy-alkylated phenols, with a member selected from the group consisting of formaldehyde and precursors thereof.

8. The process of claim 7 wherein said prepolymer has terminal —NCO groups.

9. A process for the preparation of a cross-linked polyurethane plastic which comprises reacting an etherification product of a polyalkylene ether polyalcohol containing ether bridges selected from the group consisting of oxygen and sulfur ether bridges and a member selected from the group consisting of hydroxy-alkylated aromatic amines and hydroxy-alkylated phenols with an organic polyisocyanate to form a prepolymer and thereafter reacting said prepolymer with a member selected from the group consisting of formaldehyde and precursors thereof.

10. A process for the preparation of a cross-linked polyurethane plastic which comprises reacting a prepolymer obtained from an organic polyisocyanate, a polyalkylene ether polyalcohol containing ether bridges selected from the group consisting of oxygen and sulfur ether bridges and from about 0.5 to about 3 mols per mol of said polyalkylene ether polyalcohol of a member selected from the group consisting of hydroxy-alkylated aromatic amines and hydroxy-alkylated phenols with a member selected from the group consisting of formaldehyde and precursors thereof.

11. A process for the preparation of a cross-linked polyurethane plastic which comprises reacting a prepolymer obtained from an organic polyisocyanate, a polyalkylene ether polyalcohol containing ether bridges selected from the group consisting of oxygen and sulfur ether bridges and a member selected from the group consisting of hydroxy-alkylated aromatic amines and hydroxy-alkylated phenols, with from about 0.4 to about 1.5 percent based on the weight of said prepolymer of free formaldehyde and precursors thereof.

12. The process of claim 11, wherein said member selected from the group consisting of hydroxy-alkylated aromatic amines and hydroxy-alkylated phenols is employed in an amount of from about 0.5 to about 3 mols for each one mole of polyalkylene ether polyalcohol.

13. A process for the preparation of a cross-linked polyurethane plastic which comprises reacting an organic diisocyanate with a compound selected from the group consisting of a polyalkylene ether polyalcohol having a molecular weight of at least about 500, an hydroxyl number not substantially greater than about 225 and obtained from the condensation of alkylene oxides, and polythioethers having a molecular weight of at least about 500, an hydroxyl number not substantially greater than about 225 and obtained from the condensation of thioether glycols, to prepare an isocyanate-modified polyfunctional compound having terminal —NCO groups, thereafter reacting said isocyanate-modified polyfunctional compound having terminal —NCO groups with a member selected from the group consisting of hydroxy-alkylated aromatic monoamines having two hydroxy terminated alkylene radicals attached to the nitrogen atom thereof and hydroxy-alkylated dihydric phenols having two hydroxy terminated alkylene radicals attached to phenolic oxygen atoms thereof to prepare a prepolymer having terminal hydroxyl groups and thereafter reacting said prepolymer with not substantially more than a cross-linking amount of a cross-linking agent selected from the group consisting of formaldehyde and precursors thereof.

14. A process for the preparation of a cross-linked polyurethane plastic which comprises reacting an organic diisocyanate with a member selected from the group consisting of hydroxy-alkylated aromatic monoamines having two hydroxy terminated alkylene radicals attached to the nitrogen atom thereof and hydroxy-alkylated phenols having two hydroxy terminated alkylene radicals attached to phenolic oxygen atoms thereof to prepare an —NCO terminated product, thereafter reacting said —NCO terminated product with a compound selected from the group consisting of polyalkylene ether polyalcohol having a molecular weight of at least about 500, an hydroxyl number not substantially greater than about 225 and obtained from the condensation of alkylene oxides, and polythioethers having a molecular weight of at least about 500, an hydroxyl number not substantially greater than about 225 and obtained from the condensation of thioether glycols, to prepare a prepolymer having terminal hydroxyl groups and thereafter reacting said prepolymer with not substantially more than a cross-linking amount of a cross-linking agent selected from the group consisting of formaldehyde and precursors thereof.

15. A prepolymer which comprises the reaction product of an organic polyisocyanate, a polyalkylene ether polyalcohol containing ether bridges selected from the group consisting of oxygen and sulfur ether bridges and a member selected from the group consisting of hydroxy-alkylated aromatic amines and hydroxy-alkylated phenols.

16. A prepolymer which comprises the reaction product of an organic polyisocyanate, a member selected from the group consisting of polyalkylene ether polyalcohols and polythioether polyalcohols and a member selected from the group consisting of hydroxy-alkylated aromatic amines and hydroxy-alkylated phenols.

17. A prepolymer suitable for cross-linking with a formaldehyde which comprises the reaction product of an organic polyisocyanate with a member selected from the group consisting of polyalkylene ether polyalcohols obtained from the condensation of an alkylene oxide and polythioethers obtained from the condensation of thioether glycols, and a member selected from the group consisting of hydroxy-alkylated aromatic amines and hydroxy-alkylated phenols.

18. A process for the preparation of a prepolymer suitable for cross-linking with a formaldehyde which comprises reacting an organic polyisocyanate with a polyalkylene ether polyalcohol containing ether bridges selected from the group consisting of oxygen and sulfur ether bridges and a member selected from the group consisting of hydroxy-alkylated aromatic amines and hydroxy-alkylated phenols.

19. A process for the preparation of a prepolymer suitable for cross-linking with a formaldehyde which comprises reacting an organic polyisocyanate with a polyalkylene ether polyalcohol containing ether bridges selected from the group consisting of oxygen and sulfur ether bridges in a first step to prepare an —NCO terminated product and thereafter reacting said product with a member selected from the group consisting of hydroxy-alkylated aromatic amines and hydroxy-alkylated phenols.

20. A process for the preparation of a prepolymer suitable for cross-linking with a formaldehyde which comprises reacting an organic polyisocyanate with a polyalkylene ether polyalcohol containing ether bridges selected from the group consisting of oxygen and sulfur ether bridges and from about 0.5 to about 3 mols per mol of said polyalkylene ether polyalcohol of a member selected from the group consisting of hydroxy-alkylated aromatic amines and hydroxy-alkylated phenols.

21. A process for the preparation of a prepolymer suitable for cross-linking with a formaldehyde which comprises reacting an organic diisocyanate with a compound selected from the group consisting of polyalkylene ether polyalcohols having a molecular weight of at least about 500, an hydroxyl number within the range of about 20 to about 225 and obtained from the condensation of alkylene oxides, and polythioethers having a molecular weight of at least about 500, an hydroxyl number within the range of about 20 to about 225 and obtained from the condensation of thioether glycols, to prepare an isocyanate-modified polyfunctional compound having terminal —NCO groups, thereafter reacting said isocyanate-modified polyfunctional compound having terminal —NCO groups with a member selected from the group consisting of hydroxy-alkylated aromatic mono-amines having two hydroxy terminated alkylene radicals attached to the nitrogen atom thereof and hydroxy-alkylated dihydric phenols having two hydroxy terminated alkylene radicals attached to phenolic oxygen atoms thereof to prepare a prepolymer having terminal hydroxyl groups.

22. A process for the preparation of a prepolymer suitable for cross-linking with a formaldeyde which comprises reacting an organic diisocyanate with a member selected from the group consisting of hydroxy-alkylated aromatic monoamines having two hydroxy terminated alkylene radicals attached to the nitrogen atom thereof and hydroxy-alkylated phenols having two hydroxy terminated alkylene radicals attached to phenolic oxygen atoms thereof to prepare an —NCO terminated product, thereafter reacting said —NCO terminated product with a compound selected from the group consisting of polyalkylene ether polyalcohols having a molecular weight of at least about 500, an hydroxyl number within the range of about 20 to about 225 and obtained from the condensation of alkylene oxides and polythioethers having a molecular weight of at least about 500, an hydroxyl number within the range of about 20 to about 225 and obtained from the condensation of thioether glycols to prepare a prepolymer having terminal hydroxyl groups.

23. A polyurethane plastic which comprises the reaction product of a prepolymer obtained from an organic polyisocyanate, a polyalkylene ether polyalcohol containing ether bridges selected from the group consisting of oxygen and sulphur ether bridges and a member selected from the group consisting of hydroxy-alkylated aromatic amines and hydroxy-alkylated phenols with a member selected from the group consisting of formaldehyde and precursors thereof.

24. A prepolymer suitable for cross-linking with a formaldehyde which comprises the reaction product of an organic polyisocyanate with the etherification product of a member selected from the group consisting of polyalkylene ether polyalcohols obtained from the condensation of an alkylene oxide and polythioethers obtained from the condensation of thioether glycols with a member selected from the group consisting of hydroxy-alkylated aromatic amines and hydroxy-alkylated phenols.

25. A process for the preparation of a prepolymer suitable for cross-linking with a formaldehyde which comprises reacting an organic polyisocyanate with the etherification product of a member selected from the group consisting of polyalkylene ether polyalcohols obtained from the condensation of an alkylene oxide and polythioethers obtained from the condensation of thioether glycols with a member selected from the group consisting of hydroxy-alkylated aromatic amines and hydroxy-alkylated phenols.

References Cited in the file of this patent
UNITED STATES PATENTS

| | | |
|---|---|---|
| 2,432,148 | Furness et al. | Dec. 9, 1947 |
| 2,729,618 | Muller et al. | Jan. 3, 1956 |
| 2,772,245 | Simon et al. | Nov. 27, 1956 |
| 2,861,972 | Muller et al. | Nov. 25, 1958 |
| 2,871,227 | Walter | Jan. 27, 1959 |
| 2,912,414 | Schultheis et al. | Nov. 10, 1959 |

UNITED STATES PATENT OFFICE
CERTIFICATE OF CORRECTION

Patent No. 3,043,801                     July 10, 1962

Kuno Wagner et al.

It is hereby certified that error appears in the above numbered patent requiring correction and that the said Letters Patent should read as corrected below.

Column 8, line 49, for "250° C." read -- 150° C. --.

Signed and sealed this 25th day of February 1964.

(SEAL)
Attest:

ERNEST W. SWIDER

Attesting Officer

EDWIN L. REYNOLDS

Acting Commissioner of Patents